(12) United States Patent
Proettel et al.

(10) Patent No.: US 9,745,926 B2
(45) Date of Patent: Aug. 29, 2017

(54) FLUID LINE COUPLING

(71) Applicant: Mahle International GmbH, Stuttgart (DE)

(72) Inventors: Thomas Proettel, Esslingen (DE); Eduard Seitz, Uhingen (DE)

(73) Assignee: Mahle International GmbH (DE)

( * ) Notice: Subject to any disclaimer, the term of this patent is extended or adjusted under 35 U.S.C. 154(b) by 565 days.

(21) Appl. No.: 14/269,051

(22) Filed: May 2, 2014

(65) Prior Publication Data

US 2014/0326223 A1 Nov. 6, 2014

(30) Foreign Application Priority Data

May 3, 2013 (DE) .................. 10 2013 208 187

(51) Int. Cl.
  *F02M 35/10* (2006.01)
  *F02B 33/44* (2006.01)
  *F16L 37/14* (2006.01)

(52) U.S. Cl.
  CPC ....... *F02M 35/10209* (2013.01); *F02B 33/44* (2013.01); *F02M 35/10144* (2013.01); *F16L 37/144* (2013.01)

(58) Field of Classification Search
  CPC ... F02B 41/00; F02B 33/44; F02M 35/10144; F02M 35/10209; F16L 37/144
  See application file for complete search history.

(56) References Cited

U.S. PATENT DOCUMENTS

| 5,348,353 | A | * | 9/1994 | Deweerdt | ............. | F16L 37/144 |
| | | | | | | 285/305 |
| 5,730,481 | A | * | 3/1998 | Szabo | ................... | F16L 37/144 |
| | | | | | | 285/305 |
| 5,997,048 | A | * | 12/1999 | Hulzebos | .............. | F16L 37/144 |
| | | | | | | 285/305 |

(Continued)

FOREIGN PATENT DOCUMENTS

| DE | 20014909 U1 | 10/2000 |
| DE | 102004012870 A1 | 10/2005 |

(Continued)

OTHER PUBLICATIONS

European Search Report for EP14165770 dated Jun. 26, 2014.
(Continued)

*Primary Examiner* — Mary A Davis
(74) *Attorney, Agent, or Firm* — Fishman Stewart PLLC

(57) ABSTRACT

A fluid line coupling for a mechanical and fluidic coupling may include a fluid-carrying first component and a fluid-carrying second component. A pipe body may be at least one of integrated with and attached to the first component. A connection piece may be arranged coaxially to the pipe body in an inserted position, the connection piece being at least one of integrated with and attached to the second component. A securing clip may be disposed on an outer side of the pipe body and surround the pipe body in a circumferential direction at least 180°. The securing clip may be radially adjustable relative to the pipe body between a securing position in which the connection piece is secured to the pipe body in the inserted position, and a releasing position in which the connection piece is unsecured to the pipe body in the inserted position.

16 Claims, 4 Drawing Sheets

(56) References Cited

U.S. PATENT DOCUMENTS

| | | | |
|---|---|---|---|
| 7,438,328 B2 * | 10/2008 | Mori | F02M 35/10144 285/305 |
| 7,497,478 B2 * | 3/2009 | Callahan | F02M 35/10144 285/288.1 |
| 2002/0071718 A1 * | 6/2002 | Marty | F16L 37/144 403/293 |
| 2015/0084329 A1 * | 3/2015 | Freudendahl | F16L 37/144 285/91 |

FOREIGN PATENT DOCUMENTS

| | | |
|---|---|---|
| DE | 202005019175 U1 | 5/2006 |
| DE | 202011107042 U1 | 1/2013 |
| EP | 2431515 A1 | 3/2012 |

OTHER PUBLICATIONS

English Abstract for EP2431515A1.
Bibliographic Data Sheet indicating "No Abstract Available" for DE20014909U1.
English Abstract for DE202005019175U1.
English abstract for DE-202004012870.
English abstract for DE-202011107042.

* cited by examiner

FLUID LINE COUPLING

CROSS-REFERENCE TO RELATED APPLICATIONS

This application claims priority to German Patent Application No. 10 2013 208 187.1 filed May 3, 2013, the contents of which are hereby incorporated by reference in their entirety.

TECHNICAL FIELD

The present invention relates to a fluid line coupling for the mechanical and fluidic coupling of a fluid-carrying first component to a fluid-carrying second component. The invention also relates to a charging device which can be connected by means of such a fluid line coupling to a fresh air line of a fresh air system of an internal combustion engine. Finally the present invention relates to a fresh air line of a fresh air system of an internal combustion engine which can be connected by means of a such a fluid line coupling to another fluid-carrying component.

BACKGROUND

In many areas of technology it is necessary to connect a first fluid-carrying component fluidically and mechanically to a second fluid-carrying component. In order to achieve this simply, a fluid line coupling can be used. Such fluid line couplings can be used in particular in internal combustion engines, preferably in motor vehicles, for example, in order to connect fluid-carrying lines to one another or to components to which fluid needs to be supplied or from which a fluid must be led away. Such fluid line couplings are feasible, for example, inside a cooling circuit. However, such fluid line couplings can be used particularly advantageously in the area of a fresh air system. Such a fluid line coupling is particularly suitable in the area of a charging device, in particular an exhaust gas turbocharger, in order to connect a fresh air line to an inlet of the charging device and/or in order to connect a fresh air line to an outlet of the charging device.

In order that such a fluid line coupling can be used within the framework of a series assembly, it must be comparatively easy to handle. In addition, it should also be usable for poorly accessible or poorly visible regions so that it can be mounted in particular blind and/or without tools. Furthermore, such a fluid line coupling should be comparatively easy to dismount or separate again, also preferably blind and/or without tools.

SUMMARY

The present invention is concerned with the problem of providing an improved embodiment for such a fluid line coupling which is characterized by a high reliability, by an easy handling and by being cheap to manufacture.

This problem is solved according to the invention by the subject matter of the independent claim. Advantageous embodiments are the subject matter of the dependent claims.

The invention is based on the general idea to fit the fluid line coupling with a pipe body, a connecting piece which can be plugged in therewith and with a securing clip, where the connecting piece can be plugged into the pipe body whilst the securing clip is disposed outside the pipe body and is radially adjustable relative to the pipe body between a securing position and a releasing position. In this case, connecting piece, pipe body and securing clip form three separate components. In the releasing position the connecting piece inserted in the pipe body can be withdrawn from the pipe body. In the securing position on the other hand, the connecting piece inserted in the pipe body cannot be withdrawn from the pipe body. Here it is clear that only the usual tensile forces should be applied for withdrawal, which lie below a failure limit of the components involved. In other words, in the releasing position the connecting piece can be withdrawn non-destructively from the pipe body whereas in the securing position this is not possible. Whilst applying excessive misuse forces, a withdrawal of the connecting piece from the pipe body in the securing position of the securing clip necessarily results in a destruction or damage to at least one of the three components. Whereas the connecting piece can only be withdrawn non-destructively from the pipe body in the releasing position of the securing clip, according to a preferred embodiment it can be provided that the connecting piece can always be inserted in the pipe body regardless of whether the securing clip adopts its securing position or its releasing position. When the securing clip is adjusted in the securing position, the insertion of the connecting piece into the pipe body can bring about a radial displacement of the securing clip relative to the pipe body which takes place contrary to the spring forces of the securing clip so that the securing clip is quasi-elastically braced. When the connecting piece reaches the provided insertion position in the pipe body, the securing clip can spring back radially driven by its restoring spring force and move independently into its securing position. Assembly can be simplified appreciably as a result.

In detail it is provided that the pipe body can be attached to the first component or is provided on the first component whereas the connecting piece can be attached to the second component or is provided thereon. The securing clip surrounds the pipe body in a circumferential direction over more than 180° so that in the securing position it is fixed in a self-securing manner on the pipe body or is thereby braced. In order to achieve the securing position and the releasing position, the connecting piece has a securing groove on its radially external outer side which extends in the circumferential direction. The pipe body is fitted with a securing slot which extends in the circumferential direction and which is aligned radially to the securing groove of the connecting piece when the connecting piece is inserted in the pipe body. Whereas the securing groove does not usually pass through a cylindrical wall of the connecting piece, the securing slot passes radially through a cylindrical wall of the pipe body. The securing clip now has a radially inwardly projecting securing web on its radially internal inner side which extends in the circumferential direction and which in the securing position engages radially through the securing slot into the securing groove. For transfer of the securing clip from its securing position into its releasing position, it is adjusted radially outwards relative to the pipe body until the securing web no longer engages radially in the securing groove in the releasing position. The radial engagement of the securing web in the securing groove produces an axial tight fit which fixes the connecting piece axially on the securing clip. The engagement of the securing web into the securing slot also produces an axial tight fit which fixes the securing clip axially on the pipe body so that finally the connecting piece is fixed positively on the pipe body in the axial direction via the securing clip. By withdrawing the securing web from the securing groove, only the connecting piece is released relative to the securing clip and therefore relative to the pipe body whereas the securing clip remains fixed on the pipe body at least in the axial direction. The fluid line coupling presented here can be handled easily, since only the securing clip must be adjusted radially with respect to the pipe body.

According to an advantageous embodiment, the securing web can also be disposed in the securing slot in the releasing position. In this way, a predetermined axial relative position between securing clip and pipe body can also be maintained in the releasing position, which simplifies assembly. Consequently, the securing clip also remains on the pipe body in the releasing position.

In another embodiment, the securing web starting from a longitudinal central plane can extend over more than 90° in the circumferential direction on both sides, wherein a radially measured web height in web end sections which go beyond the 90° is reduced or decreases in the direction of a web end. Through this design it is achieved that in the releasing position in the region of its web end sections which form the region of the securing web going beyond the 90° from the longitudinal central plane, the securing web can no longer project radially as far as into the securing groove and in particular remains inside the securing slot. In this way it is ensured that in the releasing position with a simple geometry of the securing clip the connecting piece can be withdrawn from the pipe body. A decreasing web height can, for example, be achieved whereby in the region of the web end sections an inner radius on a radially internal inner edge of the securing web in the region of the web end sections is greater than in the region as far as the 90° starting from the longitudinal central plane. Likewise in the region of the web end sections it is possible to provide a rectilinear profile for the web inner edge and in particular to orient this such that the respective inner edge in the releasing position extends parallel to the radial direction of adjustment of the securing clip.

According to another advantageous embodiment, on its outer side the connecting piece can have an insertion contour extending in the circumferential direction, which for example, can be configured as a bevel or insertion slope or the like. The securing clip is expediently configured to be radially spring-elastic in such a manner that when the securing clip is adjusted in the securing position the connecting piece can be inserted into the pipe body. In other words, the fluid line coupling presented here enables insertion of the connecting piece into the pipe body when the securing clip is adjusted into the securing position whereby at the same time as reaching the provided insertion position, the securing of the connecting piece in the pipe body takes place automatically. In detail, during insertion of the connecting piece into the pipe body, before reaching a predetermined insertion depth the securing web is displaced radially outwards by the insertion contour of the connecting piece and on reaching the predetermined insertion depth engages automatically into the securing groove. This is achieved by a suitable matching of the insertion contour on the securing web in conjunction with the spring elasticity of the securing clip so that during insertion the connecting piece can expand the securing clip to such an extent that it can be guided axially past the securing web until this engages automatically in the securing groove as a result of the spring force of the securing clip. This measure leads to an extreme simplification of assembly.

In another embodiment the pipe body can have two disengaging notches on its outer side, which extend axially and into which respectively one circumferential end of the securing clip engages radially in its releasing position. During transfer of the securing clip from its securing position into its releasing position, this is expanded elastically so that the circumferential ends engage in a pre-stressed manner radially into the disengaging notches and thereby bring about a positioning of the securing clip relative to the pipe body. In other words, with the aid of the disengaging notches the securing clip can be held automatically on the pipe body in the releasing position, which also facilitates assembly and disassembly. The latching between the circumferential ends and the disengaging notches can be overcome by a light pressure on the securing clip so that the securing clip snaps back automatically into its securing position driven by its spring elasticity.

In another advantageous embodiment, the securing web in the circumferential direction can have at least one web discontinuity or at least one radial web slot. The desired radial elasticity of the securing clip can be adjusted by this means. Whilst a web discontinuity extends over the entire radial height of the securing web, the web slot only interrupts the securing web over a part of its entire radial height.

Expediently a plurality of such web discontinuities or web slots can be provided which are distributed in the circumferential direction, preferably symmetrically. Alternatively to this, it can also be provided that only a single web discontinuity or only a single web slot is provided which is then located in the region of the longitudinal central plane of the securing clip or the securing web.

In another advantageous embodiment, the securing slot can have a slot discontinuity which is disposed centrally between circumferential ends of the securing slot. Complementary to this, the securing web can then have a web discontinuity in such a manner that the slot discontinuity engages radially in the web discontinuity to form a rotation prevention between securing clip and pipe body. As a result of the rotation prevention achieved in this manner between securing clip and pipe body, the securing clip can be reliably adjusted between the securing position and the releasing position.

According to another advantageous embodiment, the pipe body can have on its outer side at least one guide groove which extends in the circumferential direction. Complementary to this, the securing clip can have on its inner side at least one radially inwardly projecting guide web which extends in the circumferential direction and which at least in the securing position engages radially in the appurtenant guide groove. With the aid of the guide groove and the guide web engaging therein, an additional axial tight fit is achieved between securing clip and pipe body which improves the axial fixing between securing clip and pipe body.

In another advantageous embodiment, at least one radial seal extending in a closed manner in the circumferential direction can be provided between an inner side of the pipe body and the outer side of the connecting piece. this means the fluid line coupling can be sealed towards the outside against the fluid to be conducted. Such a radial seal can be inserted in a circumferential groove which can in principle be disposed on the inner side of the pipe body but preferably on the outer side of the connecting piece.

According to an advantageous further development, the pipe body can have a positioning slot extending in the circumferential direction axially adjacent to such a radial seal. On its inner side axially spaced apart from the securing web the securing clip can have a radially inwardly projecting positioning web which also extends in the circumferential direction and which in the securing position protrudes through the positioning slot radially beyond the inner side of the pipe body and forms an axial stop for the radial seal. The radial seal is positioned in the radial direction relative to the pipe body by the axial stop. At the same time, the positioning web engaging in the positioning slot brings about an axial tight fit for the axial fixing of the securing clip on the pipe body.

In another embodiment, at its circumferential ends the securing clip can have respectively one grip element for the manual adjustment of the securing clip in its releasing position. The handling of the fluid line coupling is made easier with the aid of such gripping elements, for example, in order to be able to withdraw the connecting piece from the pipe body. Such a gripping element can in particular be formed integrally on the securing clip.

In another advantageous embodiment, the fluid line coupling can be an air line coupling of a fresh air system for supplying fresh air to combustion chambers of an internal combustion engine, in particular a motor vehicle, and can be used for the mechanical and fluidic coupling of an air-carrying first component to an air-carrying second component. In a charged internal combustion engine, this fluid line coupling can be located in the low-pressure side or on the high-pressure side. It can be used in particular to connect a fresh air line on the inlet side or outlet side to a compressor of an exhaust gas turbocharger.

In another advantageous embodiment the securing web and the securing slot each extend in the circumferential direction over less than 360° whereas the securing groove extends in the circumferential direction over 360°, i.e. completely closed circumferentially. By this means it is possible to insert the securing connecting piece into the pipe body in any arbitrary rotational position. It is further possible to turn the connecting piece inserted in the pipe body in the circumferential direction relative to the pipe body. Securing web and securing slot extend, for example, over about 270°. Also the optionally provided guide groove and appurtenant guide web extend in the same way as the optionally provided positioning slot and the appurtenant positioning web over less than 360° in the circumferential direction, for example, likewise approximately over 270°.

In another advantageous embodiment, the pipe body can be formed integrally on the first component. Additionally or alternatively, it can be provided that the connecting piece is formed integrally on the second component. The integral design reduces the number of components to be used which facilitates handling and assembly.

The pipe body and the securing clip can preferably be made of plastic, where in principle here the same plastic can be used. The connecting piece on the other hand can be made of plastic or of metal. If the connecting piece is made of plastic, this can preferably comprise a fibre-reinforced plastic.

According to another advantageous embodiment, the first component can be a low-pressure air line of a fresh air system of a charged internal combustion engine whilst the second component is a compressor inlet of a charging device disposed in the fresh air system. Alternatively to this, the first component can be a high-pressure air line of a fresh air system of a charged internal combustion engine whilst the second component is then a compressor outlet of a charging device disposed in the fresh air system.

A charging device according to the invention, which in particular can comprise an exhaust gas turbocharger and which is suitable for a fresh air system of an internal combustion engine is fitted with a compressor inlet and a compressor outlet, where the compressor inlet and/or the compressor outlet comprises a connecting piece (15) of a fluid line coupling (1) according to any one of claims 1 to 13 or wherein the compressor inlet and the compressor outlet comprises a connecting piece of a fluid line coupling of the type described previously so that it can be connected by means of such a fluid line coupling to a low-pressure air line or to a high-pressure air line.

A fresh air line of a fresh air system of an internal combustion engine has on at least one of its ends a pipe body of a fluid line coupling of the type described previously so that this fresh air line can be connected to another component of the internal combustion engine by means of such a fluid line coupling.

Further features and advantages of the invention are obtained from the subclaims, from the drawings and from the appurtenant description of the figures by reference to the drawings.

It is understood that the features mentioned previously and to be explained further hereinafter can be used not only in the respectively specified combination but also in other combinations or alone without departing from the framework of the present invention.

Preferred exemplary embodiments of the invention are shown in the drawings and are explained in detail in the following description, where the same reference numbers refer to the same or similar or functionally the same components.

BRIEF DESCRIPTION OF THE DRAWINGS

In the figures, in each case schematically.

DETAILED DESCRIPTION

Figure 1:
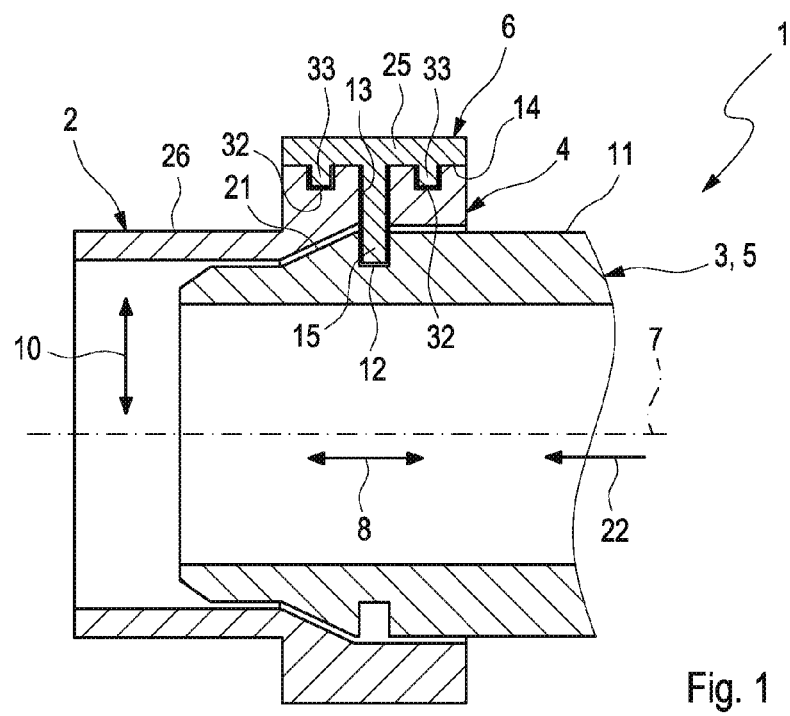
FIG. 1 shows a longitudinal section through a fluid line coupling.
Figure 2:
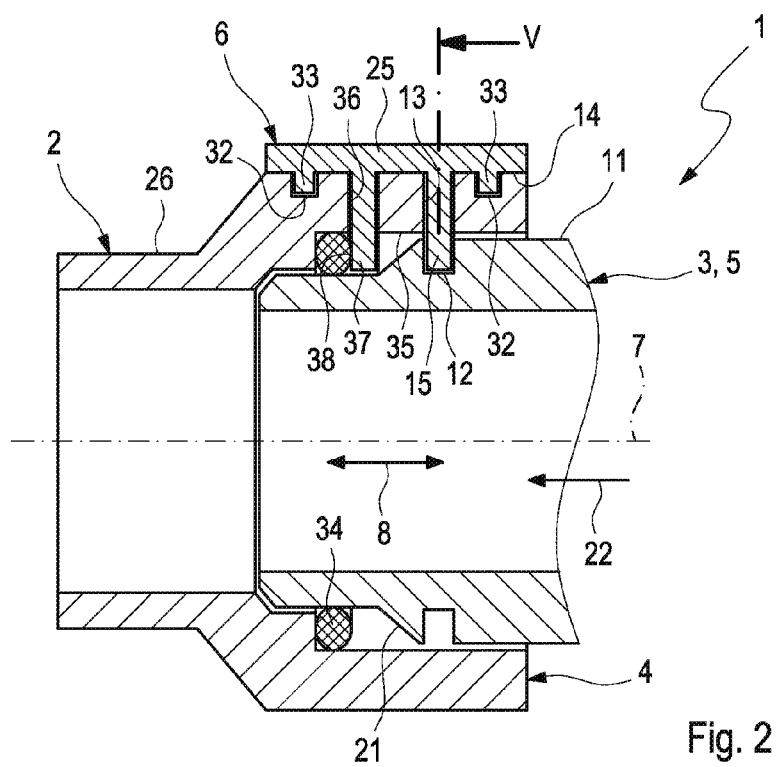
FIG. 2 shows a longitudinal section as in FIG. 1 but in another embodiment of the fluid line coupling.
Figure 7:
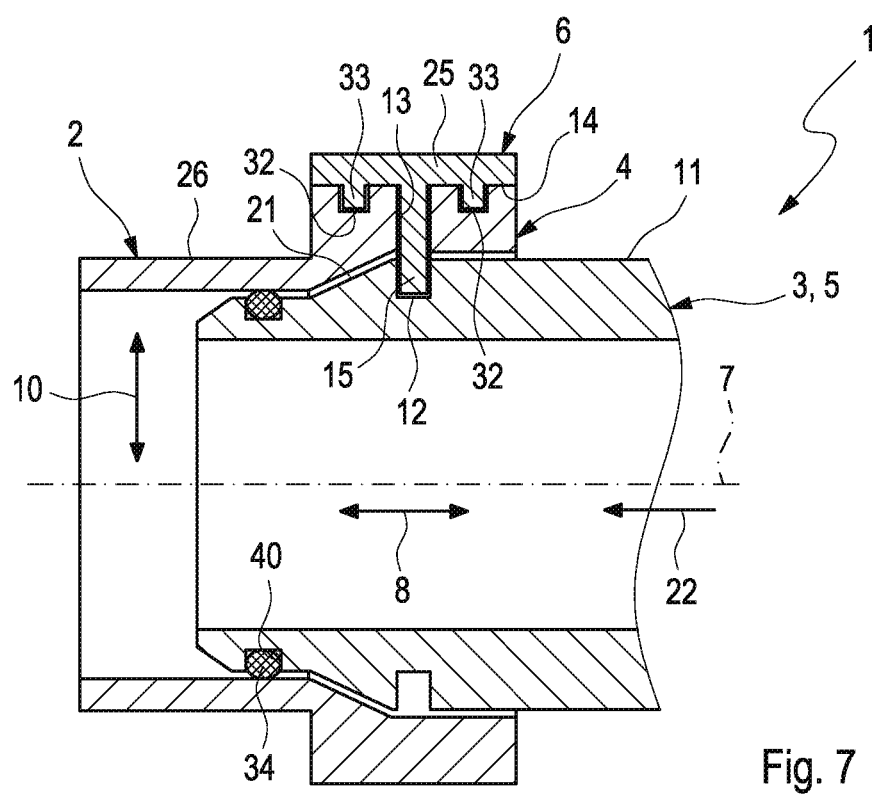
FIG. 7 shows a longitudinal section as in FIG. 1 but in another embodiment.

According to FIGS. 1, 2 and 7 a fluid line coupling 1 with the aid of which a fluid-carrying first component 2 can be coupled mechanically and fluidically to a fluid-carrying second component 3, comprises a pipe body 4, a connecting piece 5 and a securing clip 6. In the examples shown here, the pipe body 4 is formed integrally on the first component 2. In principle however, the pipe body 4 can also comprise a separate component which can be attached in a suitable manner to the first component 2. In the embodiment shown here, the connecting piece 5 is formed integrally on the second component 3. In principle, however, an embodiment is also feasible in which the connecting piece 5 is a separate component which can be attached in a suitable manner to the second component 3. In each case, however, the securing clip 6 is a separate component.

The pipe body 4 has a longitudinal central axis 7 which defines an axial direction 8 running parallel to the longitudinal central axis 7. The connecting piece 5 can be inserted coaxially into the pipe body 4 and is shown in FIGS. 1 and 2 in the inserted state. The securing clip 6 is disposed on the outside on the pipe body 4 and encloses the pip body 4 in a circumferential direction 9 indicated in FIGS. 3 to 6 over more than 180°, e.g. over approximately 270°. The securing clip 6 is adjustable relative to the pipe body 4 in a radial direction 10 between a securing position shown in FIG. 5 and a releasing position shown in FIG. 6. In the securing position according to FIG. 5, which is also reproduced in FIGS. 1 and 2, the connecting piece 5 inserted in the pipe body 4 is secured with the aid of the securing clip 6 on the pipe body 4 so that the connecting piece 5 cannot be withdrawn from the pipe body 4 without destroying the connecting piece 5 and/or the securing clip 6 and/or the pipe body 4. In contrast to this, in the releasing position the connecting piece 5 can easily be withdrawn from the pipe body 4.

The connecting piece 5 has on its radially external outer side 11 a securing groove 12 which extends in the circumferential direction 9. The pipe body 4 has a securing slot 13, which also extends in the circumferential direction 9 and which is radially in alignment with the securing groove 12 when the connecting piece 5 is inserted in the pipe body 4. On its radially internal inner side 14, the securing clip 6 has a radially inwardly projecting securing web 15 which also extends in the circumferential direction 9. In the securing position the securing web 15 extends through the securing slot 13 and additionally engages radially in the securing groove 12. In the releasing position on the other hand, the securing web 15 is adjusted radially outwards to such an extent that it can no longer engage in the securing groove 12. This relationship is reproduced in FIGS. 5 and 6. In the securing position according to FIG. 5, the securing web 15 engages radially comparatively deeply into the pipe body 4. In contrast to this, in the releasing position according to FIG. 6, the securing web 15 cannot engage radially as deeply into the pipe body 4. For better clarity the connecting piece 5 is omitted in the cross-sections in FIGS. 5 and 6. It can be seen that in the releasing position according to FIG. 6, the securing web 15 is also disposed in the securing slot 13.

Figure 3:
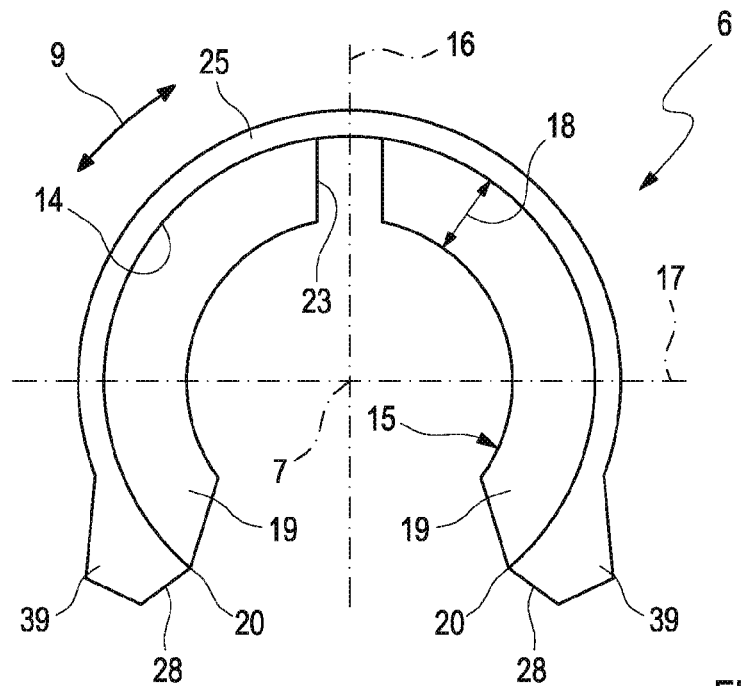
FIG. 3 shows an axial view of a securing clip of the fluid line coupling.

According to FIG. 3, starting from a longitudinal central plane 16 of the securing clip 6, the securing web 15 extends in the circumferential direction 9 on both sides over more than 90°. A normal plane 17 intersecting the longitudinal central plane 16 in the longitudinal central axis 7 indicates the 90° regions starting from the longitudinal central plane 16. The securing web 15 has a radially measured web height 18 which, in the web end sections 19 going beyond the 90° regions, is reduced or decreases in the direction of a web end 20. In the example of FIG. 3, the securing web 15 in the respective web end section 19 has a bevelled web end 20, which has a single rectilinear region. In the embodiment shown in FIGS. 5 and 6, the respective web end 20 is bevelled in two stages. As a result of the reduction of the web height 18 in the respective web end section 19, it is achieved that the securing web 15 in the releasing position according to FIG. 6 can no longer engage in the securing groove 12 of the connecting piece 5. In particular, the securing web 15 can then project only slightly beyond the securing slot 13 which is indicated in FIG. 6 on the right, or can no longer project beyond the securing slot 13, which is shown in FIG. 6 on the left.

According to FIGS. 1, 2 and 7 the connecting piece 5 can have on its outer side 11 an insertion contour 21 extending in the circumferential direction 9, which is here executed as a cone, which tapers in its insertion direction 22 in which the connecting piece 5 can be inserted into the pipe body 4. The securing clip 6 is configured to be radially spring-elastic, which for example can be achieved by an appropriate choice of material. Additionally or alternatively, measures for improving or providing the desired radial spring elasticity of the securing clips 6 explained in detail hereinafter with reference to FIGS. 3 and 4 can be implemented. In each case, the securing clip 6 is expediently configured to be spring-elastic in such a manner that the connecting piece 5 can be inserted into the pipe body 4 when the securing clip 6 is adjusted into the securing position. In this case, the insertion contour 21 impinges axially on the radially inwardly projecting securing web 15 and brings about a radially outwardly oriented displacement of the securing web 15, which is then accomplished contrary to a spring force of the securing clip 6. As soon as the connecting piece 5 achieves a predetermined insertion depth in the pipe body 4, the securing groove 12 comes into alignment with the securing web 15, whereby the securing web 15 can automatically engage in the securing groove 12. In this case, the securing web 15 is driven radially inwards by the spring force of the securing clip 6.

Figure 4:
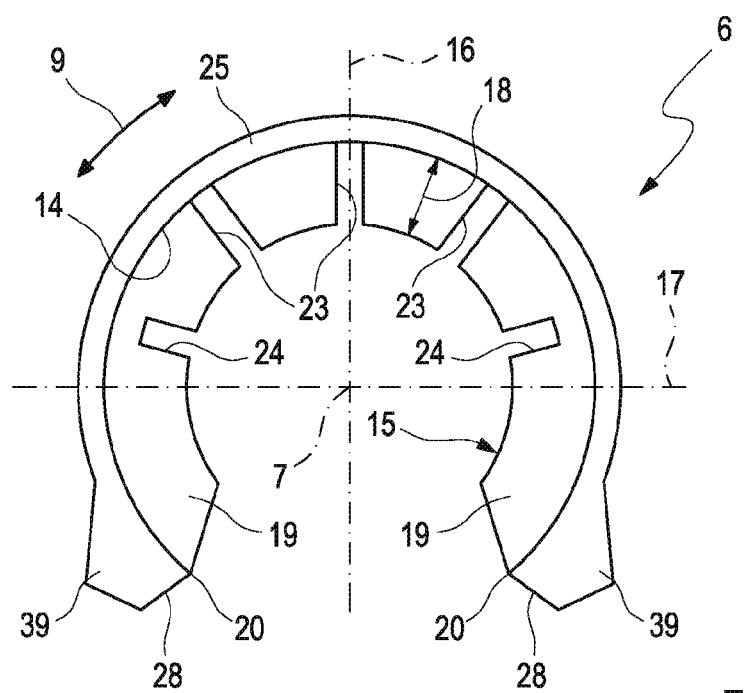
FIG. 4 shows an axial view as in FIG. 3 but in a different embodiment of the securing clip.

As can be deduced from FIGS. 3 and 4, the securing web 15 can at least have one web discontinuity 23 in the circumferential direction 9. Additionally or alternatively the securing web 15 according to FIG. 4 can have at least one radial web slot 24. Whereas such a web discontinuity 23 extends over the entire radial height 18 of the securing web 15, the respective radially inwardly open web slot 24 has smaller dimensions in the radial direction than the radial height 18 of the securing web 15. In the example of FIG. 3 a single web discontinuity 23 is positioned symmetrically to the longitudinal central plane 16. In FIG. 4 a plurality of web discontinuities 23 and in addition, a plurality of web slots 24 are provided which can expediently be distributed symmetrically to the longitudinal central plane 16 in the circumferential direction 9. The respective web discontinuity 23 or the respective web slot 24 displaces the force flow paths oriented in the circumferential direction 9 in the securing web 15 radially outwards into a strip-shaped base body 25 of the securing clip 6. The radial spring elasticity of the securing clip 6 is thereby improved.

Figure 5:
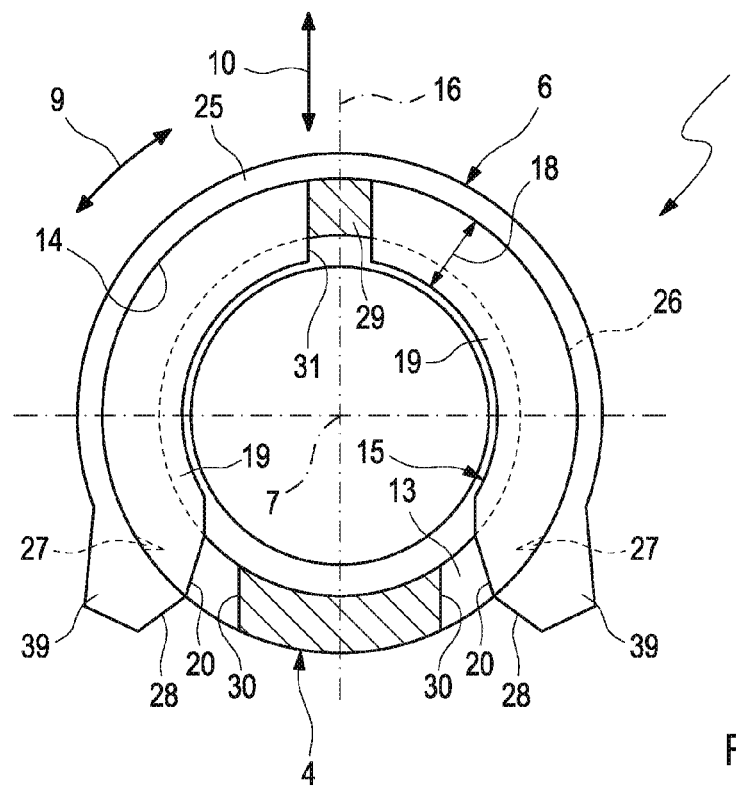
FIG. 5 shows a cross-section of the fluid line coupling according to lines of intersection V in FIG. 2 with the securing clip in a securing position.
Figure 6:
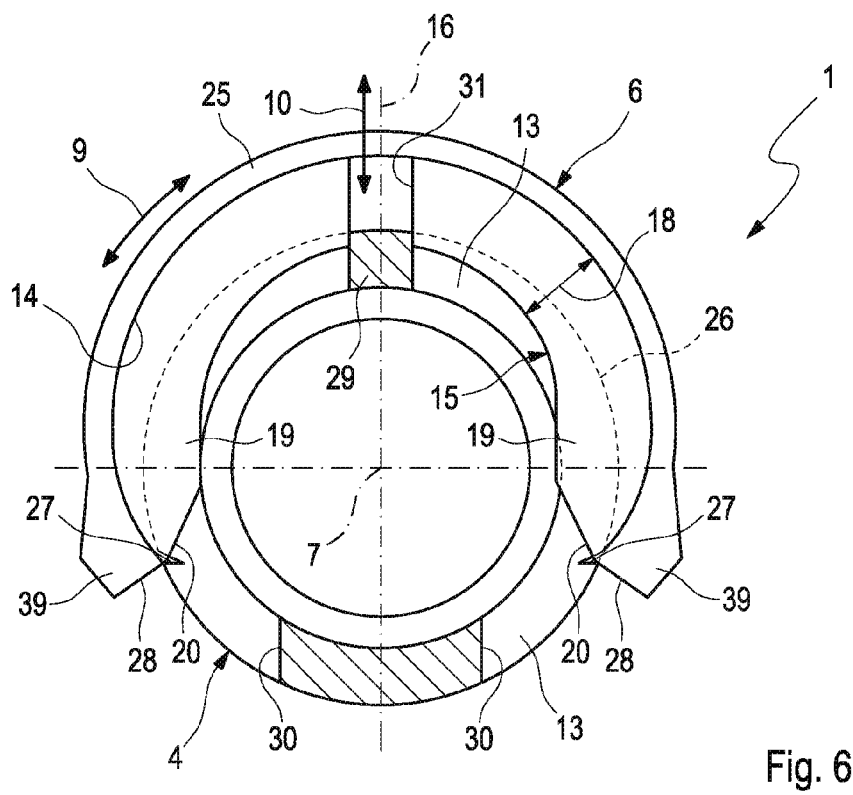
FIG. 6 shows a cross-section as in FIG. 5 but with the securing clip in a releasing position.

According to FIGS. 5 and 6, the pipe body 4 can have two disengaging notches 27 on its radially external outer side 26, which each extend axially, i.e. parallel to the longitudinal central axis 7. The disengaging notches 27 are positioned on the outer side 26 of the pipe body 4 so that in the releasing position of the securing clip 6, respectively one circumferential end 28 of the securing clip 6 can engage radially in respectively one of the disengaging notches 27, which is shown in FIG. 6. In this way, the securing clip 6 in the releasing position is positioned stably on the pipe body 4 whereby it is particularly simple to manually dismount the fluid line coupling 1 or the two components 2, 3 from one another.

In the embodiment shown in FIGS. 5 and 6, the securing slot 13 has a slot discontinuity 29 which is disposed substantially centrally between circumferential ends 30 of the securing slot 13, i.e., is also disposed centrally with respect to the longitudinal central plane 16. The securing web 15 now has a web discontinuity 31 complementary to the slot discontinuity 29 which accordingly is disposed centrally between circumferential ends 28 of the securing clip 6. According to FIGS. 5 and 6, the slot discontinuity 29, which forms an axial web on the pipe body 4, engages radially in the web discontinuity 31, whereby a rotation prevention is formed between the securing clip 6 and the pipe body 4.

According to FIGS. 1, 2 and 7 the pipe body 2 can have at least one guide groove 32 on its outer side 26, which extends in the circumferential direction 9. On its inner side 14 complementary thereto, the securing clip 6 has at least one radially inwardly projecting guide web 33. At least in the securing position, the respective guide web 33 engages radially in the appurtenant guide groove 32. In the examples of FIGS. 1, 2 and 7 two guide grooves 32 each running parallel to one another are formed on the pipe body 4 whilst two guide webs 33 running parallel to one another are provided complementary thereto on the securing clip 6.

According to FIGS. 2 and 7 at least one radial seal 34 which is closed in the circumferential direction 9 can be provided, which can be achieved for example with the aid of an O-ring. The radial seal 34 is in this case positioned between an inner side 35 of the pipe body 4 facing the connecting piece 5 and the outer side 11 of the connecting piece 5 in order to seal the fluid-carrying interior of connecting piece 5 and pipe body 4 with respect to the surroundings of the fluid line coupling 1.

In the preferred embodiment shown in FIG. 2, the pipe body 4 axially adjacent to the radial seal 34 has a positioning slot 36 provided in the circumferential direction 9 in addition to the securing slot 13. On its inner side 14 additionally to the securing web 15, the securing clip 6 has a positioning web 37 extending in the circumferential direction 9, which projects radially inwards. In the securing position the positioning web 37 extends radially through the positioning slot 36 and projects radially beyond the inner side 35 of the pipe body 4 to such an extent that it forms an axial stop 38 for the radial seal 34. Axially opposite this axial stop 38, an annular step 40 is formed on the inner side of the pipe body 2 on which the radial seal 34 can also be supported axially and radially. The positioning slot 36 extends parallel to the securing slot 13. The positioning slot 37 extends parallel to the securing web 15.

In contrast to FIG. 2, FIG. 7 shows a variant of the embodiment shown in FIG. 1 which is also fitted with a radial seal 34. In this case, a circumferential groove 40 closed in the circumferential direction is formed on the connecting piece 5, in which the radial seal 34 is inserted. The radial dimensioning of the securing web 15 can preferably be selected so that the radial seal 34 does not come in contact with the securing web 15 during insertion of the connecting piece 5 into the pipe body 2. In other word, the outer cross-section of the radial seal 34 inserted in the circumferential groove 40 is smaller than the inner cross-section of the securing web 15.

According to FIGS. 3 to 6, the securing clip 6 can have respectively one grip element 39 at its circumferential ends 28 with the aid of which a manual adjustment of the securing clip 6 is simplified. The respective grip element 39 forms a radial thickening of the circumferential end 28. In particular, the respective grip element 39 is formed integrally on the securing clip 6.

As can be deduced in particular from FIGS. 5 and 6, the securing web 15 and the securing slot 13 each extend in the circumferential direction 9 over less than 360°, i.e. for example over approximately 270°. In contrast to this, the securing groove 12 according to FIGS. 1 and 2 extends in the circumferential direction 9 over 360°, i.e., completely circumferentially in the circumferential direction 9. Consequently, the connecting piece 5 can be inserted into the pipe body 4 in any rotational position.

Expediently, the fluid line coupling 1 comprises an air line coupling of a fresh air system with the aid of which fresh air is supplied to combustion chambers of an internal combustion engine, which in particular can be disposed in a motor vehicle. Such an air line coupling 1 is then used for the mechanical and fluidic coupling of an air-carrying first component 2 to an air-carrying second component 3. The first component 2 can, for example, be a low-pressure air line of a fresh air system of a charged internal combustion engine whereas the second component 3 can be a compressor inlet of a charging device disposed in the fresh air system. Alternatively the first component 2 can, for example, be a high-pressure air line of a fresh air system of a charged internal combustion engine whereas the second component 3 can be a compressor outlet of a charging device disposed in the fresh air system. In particular, the second component 3 can thus be formed by a compressor inlet or by a compressor outlet of a compressor of an exhaust gas turbocharger which is fitted with the connecting piece 5. The first component 2 can thus in particular be a fresh air line of a fresh air system of an internal combustion engine which has, at least on one of its ends, such a pipe body 4, for example, in order to be able to simply connect the fresh air line to the aforesaid compressor inlet or to the aforesaid compressor outlet.

The invention claimed is:

1. Fluid line coupling for a mechanical and fluidic coupling, comprising:
   a fluid-carrying first component and a fluid-carrying second component,
   a pipe body at least one of integrated with and attached to the first component,
   a connecting piece arranged coaxially to the pipe body in an inserted position, the connecting piece at least one of integrated with and attached to the second component,
   a securing clip disposed on an outer side of the pipe body, the securing clip surrounding the pipe body in a circumferential direction at least 180°, wherein the securing clip is radially adjustable relative to the pipe body between a securing position in which the connecting piece is secured to the pipe body in the inserted position and a releasing position in which the connecting piece is unsecured to the pipe body in the inserted position,
   wherein the connecting piece has a securing groove on an outer side extending in the circumferential direction,
   wherein the pipe body has a securing slot extending in the circumferential direction and which is radially in alignment with the securing groove when the connecting piece and the pipe body are in the inserted position,
   wherein the securing clip has a radially inwardly projecting securing web on an inner side, the securing web extending in the circumferential direction which in the securing position engages through the securing slot radially into the securing groove and which in the releasing position is disengaged from the securing groove,
   wherein the pipe body has on an outer side at least one guide groove extending in the circumferential direction, and the securing clip on the inner side has at least one radially inwardly projecting guide web which at least in the securing position engages radially the appurtenant guide groove, and
   wherein the securing clip has a strip-shaped base body surrounding the pipe body circumferentially, and the securing web and guide web both extend radially inward from the strip-shaped base body.

2. The fluid line coupling according to claim 1, wherein the securing web is disposed in the securing slot in the releasing position.

3. The fluid line coupling according to claim 1, wherein the securing web extends over at least 90° with respect to a longitudinal central plane in the circumferential direction on both sides thereof, wherein a radially measured web height in respective web end sections extending beyond the 90° reduces in a direction of a web end.

4. The fluid line coupling according to claim 1, wherein the connecting piece has an insertion contour extending in the circumferential direction on the outer side, wherein the securing clip is has a property of being spring-elastic such that the securing clip is adjustable in the securing position to enable insertion of the connecting piece into the pipe body in the inserted position, wherein before reaching a predetermined insertion depth the securing web is displaced radially outwards by the insertion contour and upon reaching the predetermined insertion depth the securing web engages automatically into the securing groove.

5. The fluid line coupling according to claim 1, wherein the pipe body includes two disengaging notches extending axially on an outer side, wherein the securing clip includes respective circumferential ends that engage the associated disengaging notches radially in the releasing position.

6. The fluid line coupling according to claim 1, wherein the securing web in the circumferential direction has at least one of (i) at least one web discontinuity and (ii) at least one radial web slot.

7. The fluid line coupling according to claim 1, wherein:
the securing slot has a slot discontinuity disposed centrally between circumferential ends of the securing slot,
the securing web has a web discontinuity complementary to the slot discontinuity, and
the slot discontinuity engages radially in the web discontinuity forming a rotation prevention between securing clip and pipe body.

8. The fluid line coupling according to claim 1, further comprising at least one radial seal arranged between an inner side of the pipe body and an outer side of the connecting piece.

9. The fluid line coupling according to claim 8, wherein:
the pipe body has a positioning slot extending in the circumferential direction axially adjacent to the radial seal, and
the securing clip has a radially inwardly projecting positioning web on the inner side arranged axially spaced apart from the securing web, wherein in the securing position the positioning web protrudes through the positioning slot radially beyond the inner side of the pipe body thereby forming an axial stop for the radial seal.

10. The fluid line coupling according to claim 1, wherein the securing clip includes a grip element at respective circumferential ends for manually adjusting the securing clip in the releasing position.

11. The fluid line coupling according to claim 1, wherein the securing web and the securing slot each extend less than 360° in the circumferential direction, and the securing groove extends at least 360° in the circumferential direction.

12. The fluid line coupling according to claim 1, wherein at least one of:
the pipe body is formed integrally on the first component, and
the connecting piece is formed integrally on the second component.

13. The fluid line coupling according to claim 1, wherein the pipe body includes an annular step on the inner side arranged axially opposite the axial stop to delimit the radial seal.

14. A fresh air line for a fresh air system of an internal combustion engine, comprising: a fluid line coupling, the fluid line coupling including:

a fluid-carrying first component and a fluid-carrying second component;
a pipe body at least one of integrated with and attached to the first component;
a connecting piece arranged coaxially to the pipe body in an inserted position, the connecting piece at least one of integrated with and attached to the second component;
a securing clip disposed on an outer side of the pipe body, the securing clip surrounding the pipe body in a circumferential direction at least 180°, the securing clip being radially adjustable relative to the pipe body between a securing position in which the connecting piece is secured to the pipe body in the inserted position and a releasing position in which the connecting piece is unsecured from the pipe body in the inserted position;
at least one radial seal arranged between an inner side of the pipe body and an outer side of the connecting piece;
wherein the connecting piece has a securing groove on an outer side extending in the circumferential direction;
wherein the pipe body includes at least one guide groove extending in the circumferential direction on an outer side, and the securing clip includes at least one complimentary radially inwardly projecting guide web on an inner side, wherein the at least one guide web engages the at least one guide groove in the securing position;
wherein the pipe body has a securing slot extending in the circumferential direction and which is radially aligned with the securing groove in the inserted position;
wherein the securing clip has a radially inwardly projecting securing web extending in the circumferential direction on the inner side, wherein in the securing position the securing web radially engages the securing groove via the securing slot, and in the releasing position the securing web is disengaged from the securing groove;
wherein the pipe body has a positioning slot extending in the circumferential direction axially adjacent to the radial seal, and
wherein the securing clip has a radially inwardly projecting positioning web on the inner side arranged axially spaced apart from the securing web, wherein in the securing position the positioning web protrudes through the positioning slot radially beyond the inner side of the pipe body thereby forming an axial stop for the radial seal.

15. The fresh air line according to claim 14, wherein the pipe body includes two disengaging notches extending axially on the outer side, wherein the securing clip includes respective circumferential ends that engage the associated disengaging notches radially in the releasing position.

16. A fluid line coupling for a mechanical and fluidic coupling, comprising:
a fluid-carrying first component and a fluid-carrying second component,
a pipe body at least one of integrated with and attached to the first component,
a connecting piece arranged coaxially to the pipe body in an inserted position, the connecting piece at least one of integrated with and attached to the second component,
a securing clip disposed on an outer side of the pipe body, the securing clip surrounding the pipe body in a circumferential direction at least 180°, wherein the securing clip is radially adjustable relative to the pipe body between a securing position in which the connecting piece is secured to the pipe body in the inserted position and a releasing position in which the connecting piece is unsecured to the pipe body in the inserted position, and at least one radial seal arranged between an inner side of the pipe body and an outer side of the connecting piece, wherein the connecting piece has a securing groove on an outer side extending in the circumferential direction, wherein the pipe body has a securing slot extending in the circumferential direction and which is radially in alignment with the securing groove when the connecting piece and the pipe body are in the inserted position, wherein the securing clip has a radially inwardly projecting securing web on an inner side, the securing web extending in the circumferential direction which in the securing position engages through the securing slot radially into the securing groove and which in the releasing position is disengaged from the securing groove, wherein the pipe body has a positioning slot extending in the circumferential direction axially adjacent to the radial seal, and wherein the securing clip has a radially inwardly projecting positioning web on the inner side arranged axially spaced apart from the securing web, wherein in the securing position the positioning web protrudes through the positioning slot radially beyond the inner side of the pipe body thereby forming an axial stop for the radial seal.

\* \* \* \* \*